(12) United States Patent
Liu (10) Patent No.: US 11,172,517 B2
(45) Date of Patent: Nov. 9, 2021

(54) METHOD AND APPARATUS FOR PERFORMING SPATIAL REUSE ENHANCEMENT IN MULTIPLE STATION ENVIRONMENT

(71) Applicant: Realtek Semiconductor Corp., HsinChu (TW)

(72) Inventor: Chia-Yi Liu, Taichung (TW)

(73) Assignee: Realtek Semiconductor Corp., HsinChu (TW)

( * ) Notice: Subject to any disclaimer, the term of this patent is extended or adjusted under 35 U.S.C. 154(b) by 78 days.

(21) Appl. No.: 16/872,333

(22) Filed: May 11, 2020

(65) Prior Publication Data

US 2021/0092765 A1    Mar. 25, 2021

(30) Foreign Application Priority Data

Sep. 23, 2019    (TW) .................................. 108134210

(51) Int. Cl.
*H04W 16/16*    (2009.01)
*H04W 74/08*    (2009.01)
*H04W 16/14*    (2009.01)

(52) U.S. Cl.
CPC ......... *H04W 74/085* (2013.01); *H04W 16/14* (2013.01)

(58) Field of Classification Search
CPC ............................ H04W 74/085; H04W 16/14
USPC ............................... 370/329, 310.2; 455/418
See application file for complete search history.

(56) References Cited

U.S. PATENT DOCUMENTS

| 10,172,137 | B1* | 1/2019 | Hedayat | H04W 72/085 |
|---|---|---|---|---|
| 10,470,128 | B2* | 11/2019 | Noh | H04L 27/2602 |
| 2017/0118725 | A1* | 4/2017 | Chu | H04W 72/0446 |
| 2017/0142659 | A1* | 5/2017 | Noh | H04W 52/0245 |
| 2017/0188376 | A1* | 6/2017 | Noh | H04W 72/085 |
| 2017/0289819 | A1* | 10/2017 | Kim | H04W 74/0808 |
| 2017/0359821 | A1* | 12/2017 | Zhou | H04W 72/0446 |
| 2018/0220456 | A1* | 8/2018 | Kim | H04W 74/0808 |
| 2019/0021091 | A1* | 1/2019 | Ko | H04W 74/002 |
| 2019/0230703 | A1* | 7/2019 | Lv | H04B 17/318 |
| 2019/0327741 | A1* | 10/2019 | Li | H04W 72/0453 |
| 2021/0014695 | A1* | 1/2021 | Minotani | H04W 72/04 |
| 2021/0266906 | A1* | 8/2021 | Hedayat | H04W 72/085 |

* cited by examiner

*Primary Examiner* — Danh C Le
(74) *Attorney, Agent, or Firm* — Winston Hsu (57) ABSTRACT

A method and apparatus for performing spatial reuse (SR) enhancement in a multiple-station environment are provided. The method includes: in response to a wireless communications device receiving a receiving packet, checking SR limitation to perform first stage SR determination; in response to the SR limitation conforming to a predetermined condition, triggering a transmitting module to start performing second stage SR determination; scanning at least one contention queue within the transmitting module to obtain an index of a candidate station from the contention queue; obtaining latest information of the candidate station from an internal database of the wireless communications device based on the index, to calculate a threshold dedicated to the candidate station according to the latest information of the candidate station; and comparing a strength indicator corresponding to the receiving packet with the threshold to generate a comparison result, to control triggering of SR backoff according to the comparison result.

19 Claims, 4 Drawing Sheets

METHOD AND APPARATUS FOR PERFORMING SPATIAL REUSE ENHANCEMENT IN MULTIPLE STATION ENVIRONMENT

BACKGROUND OF THE INVENTION

1. Field of the Invention

The present invention is related to wireless communications systems, and more particularly, to a method and an apparatus for performing spatial reuse (SR) enhancement in a multiple-station environment.

2. Description of the Prior Art

One or more devices within a conventional wireless communications system may perform spatial reuse (SR), which may cause some problems. For example, when a first device is transmitting a first wireless packet, a second device may try to spatially reuse channel resources that are being used by the first wireless packet. More particularly, the second device may spatially reuse channel resources by transmitting a second wireless packet, such as a packet that is concurrent with the first wireless packet and using a channel or a sub-channel overlapped with that being used by the first wireless packet. As the related art lacks a proper and robust determination mechanism, erroneous operations may occur due to erroneous determination. For example, a transmitting power (TX power) of the second wireless packet may be too high or too low, interfering with transmission of the first wireless packet or making the transmitted packet unable to be detected. This may necessitate an additional and unnecessary re-transmission, thereby wasting the bandwidth. As a result, overall performance of the conventional wireless communications system degrades. Thus, there is a need for a novel method and associated architecture to improve overall performance of a wireless communications system without introducing any side effect or in a way that is less likely to introduce side effects.

SUMMARY OF THE INVENTION

An objective of the present invention is to provide a method and an apparatus for performing spatial reuse (SR) enhancement in a multiple-station environment, to solve the aforementioned problem.

Another objective of the present invention is to provide a method and an apparatus for performing SR enhancement in a multiple-station environment, to improve the overall performance of the wireless communications system without introducing any side effect or in a way that is less likely to introduce side effects.

At least one embodiment of the present invention provides a method for performing SR enhancement in a multiple-station environment, wherein the method is applicable to a wireless communications device. The method may comprise: in response to the wireless communications device receiving a receiving (RX) packet, checking an SR limitation to perform first stage SR determination; in response to the SR limitation conforming to a predetermined condition, triggering a transmitting (TX) module to start performing second stage SR determination, wherein the TX module is positioned in the wireless communications device; scanning at least one contention queue within the TX module to obtain an index of a candidate station from the at least one contention queue, wherein the candidate station is selected from a plurality of stations within the multiple-station environment; obtaining latest information of the candidate station from an internal database of the wireless communications device based on the index, to calculate a threshold dedicated to the candidate station according to the latest information of the candidate station; and comparing a strength indicator corresponding to the RX packet with the threshold to generate a comparison result, to control triggering of SR backoff according to the comparison result.

At least one embodiment of the present invention provides an apparatus for performing SR enhancement in a multiple-station environment. The apparatus is applicable to a wireless communications device. The apparatus may comprise: at least one memory, positioned in the wireless communications device, configured to store information for providing an internal database of the wireless communications device; and a Media Access Control (MAC) circuit, positioned in the wireless communications device and coupled to the at least one memory, configured to control operations of the wireless communications device. For example: in response to the wireless communications device receiving an RX packet, the MAC circuit checks an SR limitation to perform first stage SR determination; in response to the SR limitation conforming to a predetermined condition, the MAC circuit triggers a TX module to start performing second stage SR determination, wherein the TX module is positioned in the MAC circuit; the MAC circuit scans at least one contention queue within the TX module to obtain an index of a candidate station from the at least one contention queue, wherein the candidate station is selected from a plurality of stations within the multiple-station environment; the MAC circuit obtains latest information of the candidate station from the internal database based on the index, to calculate a threshold dedicated to the candidate station according to the latest information of the candidate station; and the MAC circuit compares a strength indicator corresponding to the RX packet with the threshold to generate a comparison result, to control triggering of SR backoff according to the comparison result.

The present invention can perform proper control regarding spatial reuse by properly performing management related to respective information of the plurality of stations, in order to effectively reduce signal interference and occurrence of transmission failure. In addition, implementing related embodiments of the present invention will not greatly increase additional costs. Thus, the problem of the related art can be solved. In comparison with the related art, the present invention can achieve optimal performance of the wireless communications system without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
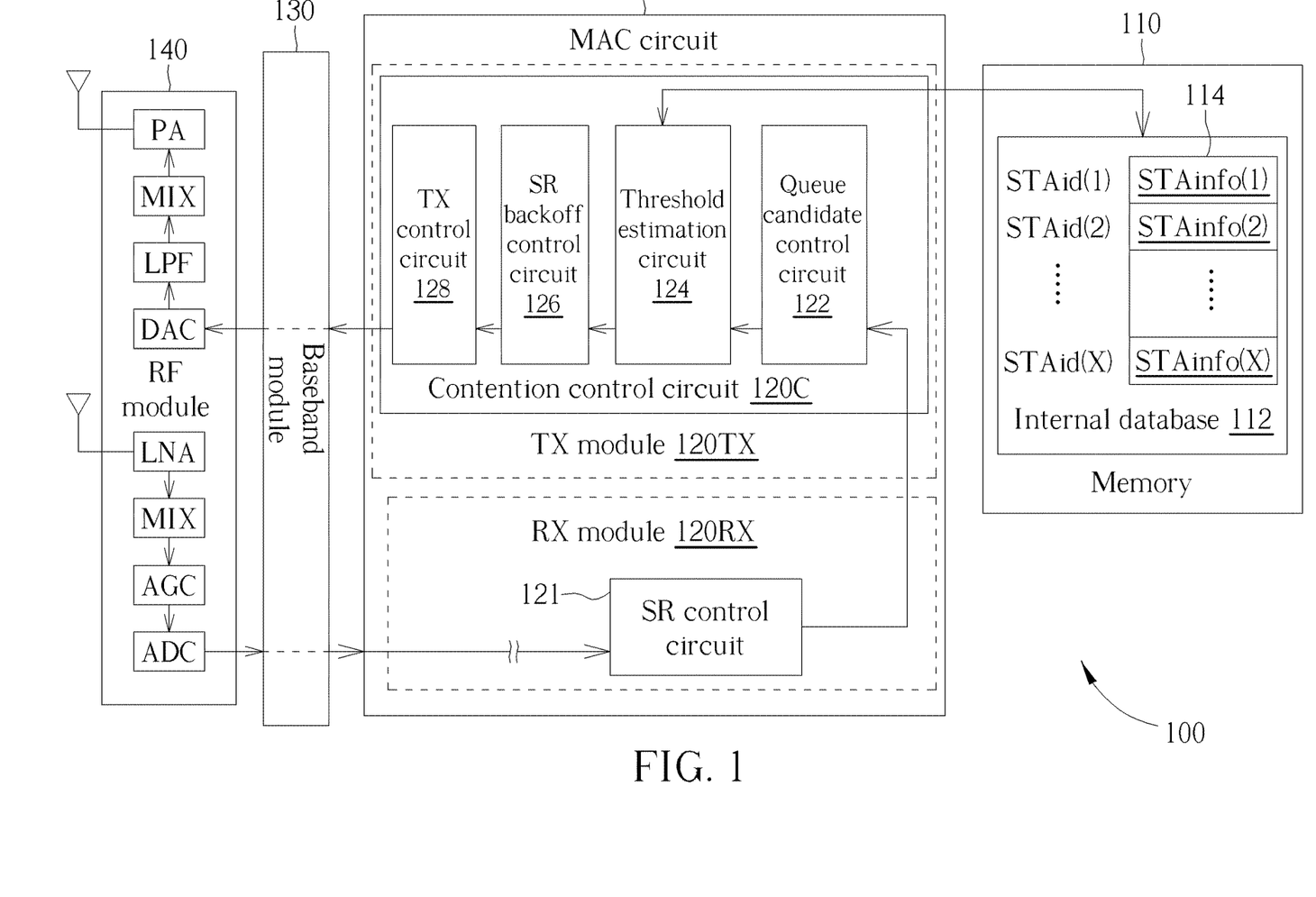
FIG. 1 is a diagram illustrating a wireless communications device according to an embodiment of the present invention.

FIG. 1 is a diagram illustrating a wireless communications device 100 according to an embodiment of the present invention. The wireless communications device 100 may comprise at least one memory (e.g. one or more memories) such as a memory 110, a Media Access Control (MAC) circuit 120, a baseband module 130 and a radio frequency (RF) module 140. The memory 110 may comprise an internal database 112, and the internal database 112 may comprise at least one station information table (e.g. one or more station information tables) such as a station information table 114. The MAC circuit 120 may comprise a receiving (RX) module 120RX and a transmitting (TX) module 120TX, where the RX module 120RX may comprise a spatial reuse (SR) control circuit 121 and one or more other circuits, and the TX module 120TX may comprise a contention control circuit 120C, and more particularly, the contention control circuit 120C may comprise a queue candidate control circuit 122, a threshold estimation circuit 124, an SR backoff control circuit 126 and a TX control circuit 128. The above components may be coupled to one another as shown in FIG. 1, but the present invention is not limited thereto. For example, one or more additional components may be added to the architecture shown in FIG. 1, and/or connection between some components may vary. In addition, the SR control circuit 121 may be coupled to an RX path within the wireless communications device 100, and the contention control circuit 120C (e.g. the queue candidate control circuit 122, the threshold estimation circuit 124, the SR backoff control circuit 126 and the TX control circuit 128) may be coupled to a TX path within the wireless communication device 100, where the RX path and the TX path are formed by a set of components (e.g. a low noise amplifier (LNA), a mixer (MIX), an automatic gain control (AGC) and an analog-to-digital converter (ADC)) and another set of components (e.g. a digital-to-analog converter (DAC), a low pass filter (LPF), a mixer (MIX) and a power amplifier (PA)) within the RF module 140, respectively, but the present invention is not limited thereto. The aforementioned at least one memory such as the memory 110 may be configured to store information for the internal database 112. The MAC circuit 120 may be configured to control operations of the wireless communications device 100. The baseband module 130 may be configured to perform baseband processing. The RF module 140 may be configured to perform RF processing to allow the wireless communications device 100 to receive or transmit packets through one or more antennas.

Based on the architecture shown in FIG. 1, the wireless communications device 100 may perform spatial reuse, and more particularly, perform related operations conforming to the Institute of Electrical and Electronics Engineers (IEEE) 802.11AX specification. The wireless communications device 100 may establish and update the internal database 112 (e.g. the aforementioned at least one station information table such as the station information table 114) to own respective various information of at least one portion of devices within various wireless communications devices (e.g. a portion or all of the devices) in an environment, such as multiple sets of information STAinfo(1), STAinfo(2), . . . and STAinfo(X) respectively corresponding to a plurality of stations STA (1), STA (2), . . . and STA (X), to properly and precisely perform related determination, where the wireless communications device 100 may update the sets of information STAinfo(1), STAinfo(2), . . . and STAinfo(X) to be respective latest information of the stations STA(1), STA(2), . . . and STA(X), but the present invention is not limited thereto. For example, when another wireless communications device is transmitting a first wireless packet, the wireless communications device 100 may try to spatially reuse the resource that is being used by the first wireless packet, and more particularly, spatially reuse the resource by transmitting a second wireless packet, such as a packet that is concurrent with the first wireless packet and using a channel or a sub-channel overlapped with that being used by the first wireless packet. As the wireless communications device 100 is equipped with a proper and robust determination mechanism, the present invention can prevent the problems of the related art, such as erroneous operations caused by erroneous determination.

According to some embodiments, an apparatus for performing SR enhancement in a multiple-station environment may comprise at least one portion (e.g. a portion or all) of the wireless communications device 100. For example, the apparatus may comprise a processing circuit of the wireless communications device 100, and the processing circuit may comprise the memory 110 and the MAC circuit 120, and more particularly, may further comprise the baseband module 130 and the RF module 140, where the processing circuit may be implemented as one or more integrated circuits or a chip set. In another example, the apparatus may comprise the whole wireless communications device 100.

Figure 2:
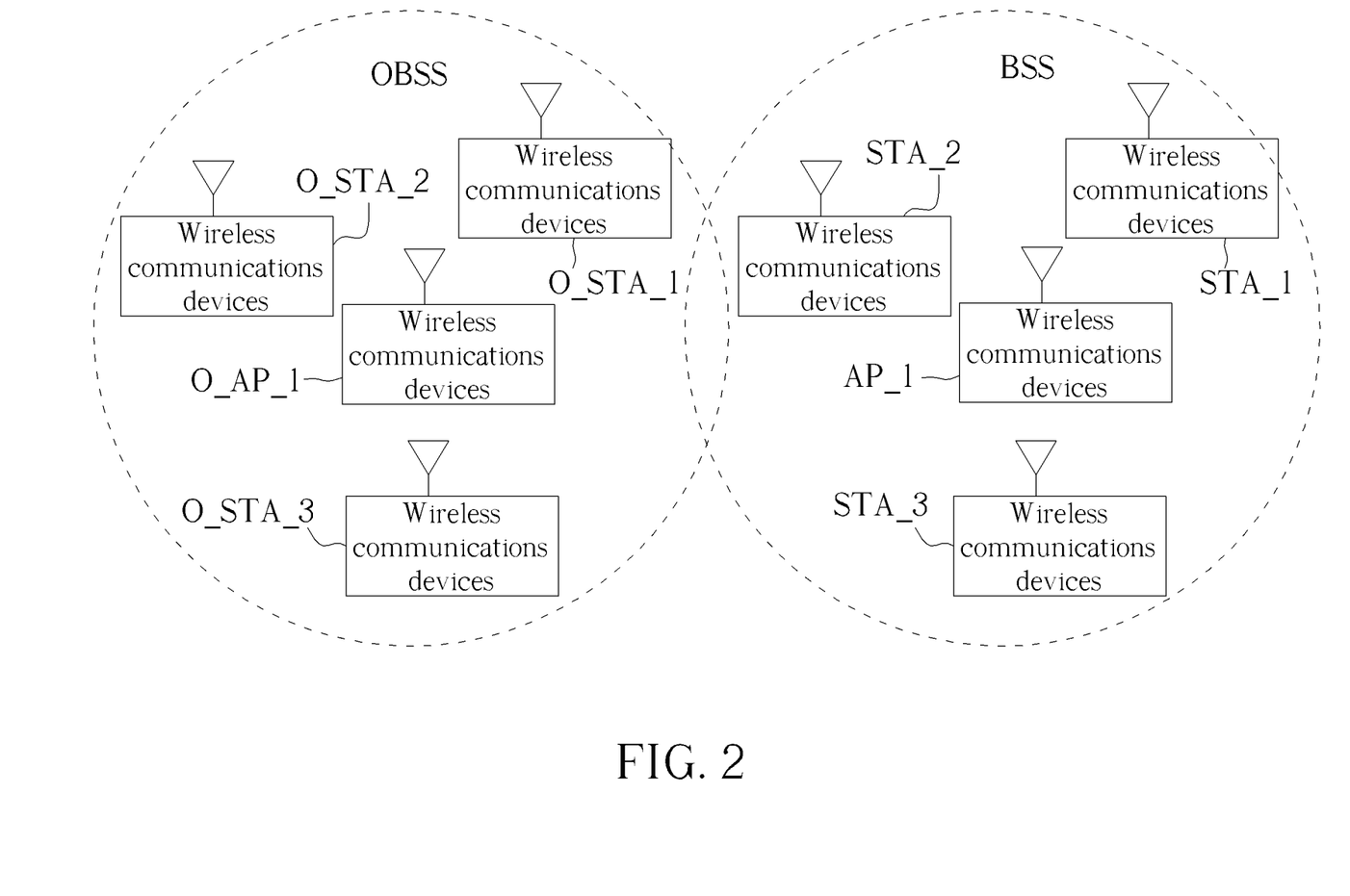
FIG. 2 illustrates a Basic Service Set (BSS) and an Overlapping Basic Service Set (OBSS) involved with the wireless communications device shown in FIG. 1 according to an embodiment of the present invention.

FIG. 2 illustrates a Basic Service Set (BSS) and an Overlapping Basic Service Set (OBSS) involved with the wireless communications device 100 according to an embodiment of the present invention. As shown in FIG. 2, the BSS and the OBSS may comprise wireless communications devices {AP_1, STA_1, STA_2, STA_3, . . . } and {O_AP_1, O_STA_1, O_STA_2, O_STA_3, . . . }, respectively, where the wireless communications devices AP_1 and O_AP_1 may be implemented as access points (APs), and the wireless communications devices {STA_1, STA_2, STA_3, . . . } and {O_STA_1, O_STA_2, O_STA_3, . . . } may be implemented as stations (STAs). The wireless communications device AP_1 may be an example of the wireless communications device 100, and at least one portion of other devices (e.g. a portion or all of the other devices) such as the wireless communications devices {STA_1, STA_2, STA_3, . . . } and {O_STA_1, O_STA_2, O_STA_3, . . . } may be examples of the aforementioned at least one portion of devices, but the present invention is not limited thereto.

Figure 3:
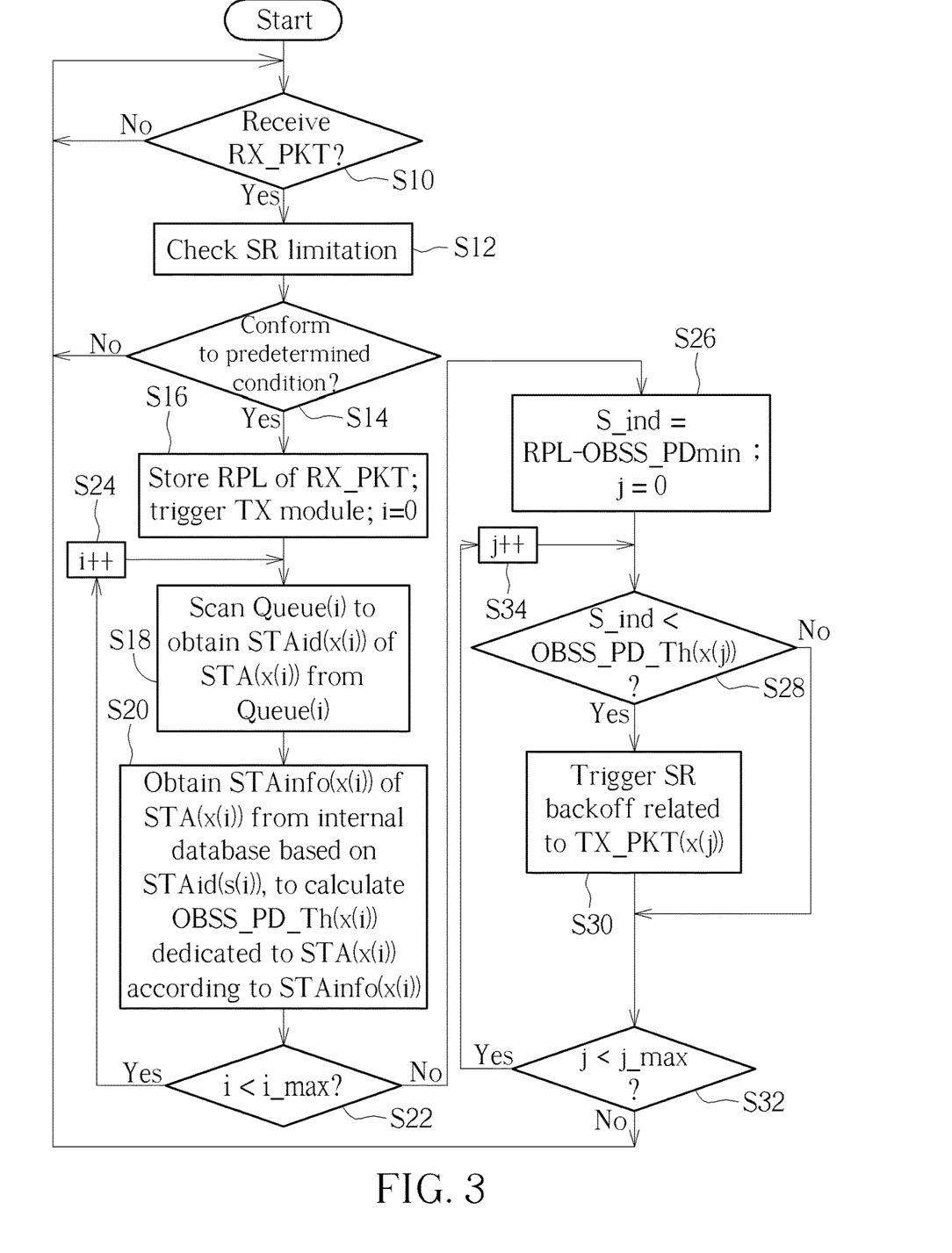
FIG. 3 is a flowchart illustrating a method for performing spatial reuse (SR) enhancement in a multiple-station environment according to an embodiment of the present invention.

FIG. 3 is a flowchart illustrating a method for performing SR enhancement in a multiple-station environment according to an embodiment of the present invention. The method is applicable to the wireless communications device 100 (more particularly, the architecture shown in FIG. 1, e.g. the memory 110, the MAC circuit 120, etc.), and may be executed by the apparatus.

In Step S10, the MAC circuit 120 (e.g. the SR control circuit 121) may determine whether the wireless communications device 100 receives an RX packet RX_PKT. If Yes, Step S12 is entered; if No, Step S10 is entered. For example, the wireless communications device 100 may receive this RX packet RX_PKT through the RX path.

In Step S12, the MAC circuit 120 (e.g. the SR control circuit 121) may check an SR limitation to perform first stage SR determination.

In Step S14, the MAC circuit 120 (e.g. the SR control circuit 121) may determine whether the SR limitation conforms to a predetermined condition. If Yes, Step S16 is entered; if No, Step S10 is entered. For example, the SR limitation conforming to the predetermined condition may comprise the RX packet RX_PKT belonging to a predetermined type of packets, and the operation of checking the SR limitation may comprise checking whether the RX packet RX_PKT belongs to the predetermined type of packets, but the present invention is not limited thereto. In some embodiments, the wireless communications device 100 may belong to the BSS, and the predetermined type of packets may represent one or more packets belonging to the OBSS, such as a packet transmitted by a certain wireless communications device within the OBSS, but the present invention is not limited thereto.

In Step S16, the MAC circuit 120 (e.g. the SR control circuit 121) may store an RX power level RPL of the RX packet RX_PKT, and trigger the TX module 120TX to start performing second stage SR determination. More particularly, the MAC circuit 120 (e.g. the SR control circuit 121) may transmit the RX power level RPL to the TX module 120TX (e.g. the queue candidate control circuit 122) for further usage. In addition, when the TX module 120TX starts performing the second stage SR determination, the MAC circuit 120 (e.g. the contention control circuit 120C) may set a loop index i to be an initial value such as 0.

In Step S18, the MAC circuit 120 (e.g. the queue candidate control circuit 122) may scan at least one contention queue (e.g. one or more contention queues) within the TX module 120TX, such as a queue Queue (i) within (i_max+1) queues {Queue (0), . . . , Queue (i_max)}, to obtain an index STAid(x(i)) of a candidate station STA(x(i)) from the at least one contention queue such as the Queue(i), where i_max may be a positive integer, but the present invention is not limited thereto. For example, the queue candidate control circuit 122 may comprise the at least one contention queue such as the (i_max+1) queues {Queue(0), . . . , Queue (i_max)}. In addition, the candidate station STA(x(i)) may be selected from the stations STA(1), STA(2), . . . and STA(X), and the index STAid(x(i)) is queued in the at least one contention queue such as the queue Queue(i) to indicate that a TX packet TX_PKT(x(i)) corresponding to the candidate station STA (x (i)) is waiting for being transmitted to the candidate station STA(x(i)).

In Step S20, the MAC circuit 120 (e.g. the threshold estimation circuit 124) may obtain latest information STAinfo(x(i)) of the candidate station STA(x(i)) from the internal database 112 based on the index STAid(s(i)), to calculate a threshold OBSS_PD_Th(x(i)) dedicated to the candidate station STA(x(i)) according to the latest information STAinfo(x(i)) of the candidate station STA(x(i)). For example, the MAC circuit 120 (e.g. the threshold estimation circuit 124) may query the at least one station information table such as the station information table 114 according to the index STAid(x(i)), to obtain the latest information STAinfo(x(i)) of the candidate station STA(x(i)).

In Step S22, the MAC circuit 120 (e.g. the contention control circuit 120C) may determine whether i<i_max. If Yes, Step S24 is entered; if No, Step S26 is entered.

In Step S24, the MAC circuit 120 (e.g. the contention control circuit 120C) increases the loop index i with an increment such as 1 (labeled "i++" in FIG. 3 for brevity).

In Step S26, the MAC circuit 120 (e.g. the threshold estimation circuit 124) may calculate a strength indicator S_ind corresponding to the RX packet RX_PKT. For example:

$$S\_ind = RPL - OBSS\_PD\ min;$$

where the strength indicator S_ind represents a difference obtained by the RX packet power level RPL of the RX packet RX_PKT minus a predetermined value such as a parameter OBSS_PDmin, e.g. a difference (RPL−OBSS_PDmin). For related details of the parameter OBSS_PDmin, please refer to the IEEE 802.11AX specification. In addition, the MAC circuit 120 (e.g. the contention control circuit 120C) may set a loop index j as an initial value such as 0.

In Step S28, the MAC circuit 120 (e.g. the threshold estimation circuit 124) may determine whether S_ind<OBSS_PD_Th(x (j)). If Yes, Step S30 is entered; if No, Step S32 is entered.

In Step S30, the MAC circuit 120 (e.g. the threshold estimation circuit 124) may trigger SR backoff related to the TX packet TX_PKT(x(j)). Accordingly, the SR backoff control circuit 126 may perform the SR backoff related to the TX packet TX_PKT(x(j)), and more particularly, generate a random number and perform countdown according to the random number to wait for performing spatial reuse. For example, in a situation where there is no other wireless communications device performing spatial reuse until the end of the countdown, the SR backoff control circuit 126 may trigger the TX control circuit 128 to perform TX control in order to transmit the TX packet TX_PKT(x(j)) to a candidate station STA(x(j)) through the TX path and the corresponding antenna.

According to this embodiment, the MAC circuit 120 (e.g. the threshold estimation circuit 124) may compare the strength indicator S_ind corresponding to the RX packet RX_PKT with the threshold OBSS_PD_Th(x(j)) to generate a comparison result (which may indicate whether S_ind<OBSS_PD_Th(x(j))), to control triggering of the SR backoff related to the TX packet TX_PKT(x(j)) according to the comparison result.

In Step S32, the MAC circuit 120 (e.g. the contention control circuit 120C) may determine whether j<j_max. If Yes, Step S34 is entered; if No, Step S10 is entered. For example, j_max=i_max.

In Step S34, the MAC circuit 120 (e.g. the contention control circuit 120C) increases the loop index j with an increment such as 1 (labeled "j++" in FIG. 3 for brevity).

For better comprehension, the method may be illustrated by the working flow shown in FIG. 3, but the present invention is not limited thereto. According to some embodiments, one or more steps may be added, deleted or modified in the working flow shown in FIG. 3. For example, the calculation related to the strength indicator S_ind in Step S26 may be integrated into Step S28, and more particularly, the MAC circuit 120 (e.g. the threshold estimation circuit 124) may determine whether (RPL−OBSS_PDmin) <OBSS_PD_Th(x(j)) in Step S28. In another example, the calculation related to the strength indicator S_ind in Step S26 may be integrated into Step S28 as mentioned above, and the loop comprising Steps S18-S24 and the loop comprising Steps S28-S34 may be integrated into a same loop using a same loop index such as the loop index i; the sub-flow of Steps S28-S30 may be inserted between Steps S20 and S22, and the loop index j in Steps S28-S30 may be replaced with the loop index i, where the determination result "No" of Step S28 points towards Step S22, and the determination result "No" of Step S22 points towards Step S10. For brevity, similar descriptions for these embodiments are not repeated in detail here.

According to some embodiments, the contention control circuit 120C of the TX module 120TX may comprise a control logic circuit for controlling the loop comprising Steps S18-S24 and/or the loop comprising S28-S34 (e.g. the loop comprising Steps S18-S24 and the loop comprising Steps S28-S34), but the present invention is not limited thereto.

According to some embodiments, when the other wireless communications device is transmitting the first wireless packet such as the RX packet RX_PKT, the wireless communications device 100 may try to perform spatial reuse, and more particularly, by transmitting the second wireless packet such as a TX packet TX_PKT (e.g. the TX packet TX_PKT(x(j)) mentioned in Step S30). In order to prevent affecting the RX packet RX_PKT that is being transmitted, the wireless communications device 100 (e.g. the MAC circuit 120, and more particularly, the TX module 120TX therein) may properly adjust TX power of the TX packet TX_PKT. For example, the MAC circuit 120 (e.g. the threshold estimation circuit 124) may calculate a corresponding threshold OBSS_PD_Threshold (e.g. the threshold OBSS_PD_Th(x(i)) mentioned in Step S20) according to the following equation:

$$OBSS\_PD\_Threshold = TXPWRref - f((TXPWR - POWER\_TOLERANCE - PWR\_Offset));$$

where TXPWRref may represent a predetermined hardware-defined power reference value, TXPWR may represent a TX power value corresponding to a predetermined data rate, POWER_TOLERANCE may represent a power tolerance range, PWR_Offset may represent a power offset value corresponding to the predetermined data rate, and f( ) may represent a conversion function for converting a power value into a TX packet power level, but the present invention is not limited thereto. In another example, the MAC circuit 120 does not need to convert some parameters related to power into power levels, and the MAC circuit 120 (e.g. the threshold estimation circuit 124) may calculate the corresponding threshold OBSS_PD_THRESHOLD according to the following equation:

$$OBSS\_PD\_Threshold = TXPWRref - (TXPWR - POWER\_TOLERANCE - PWR\_Offset);$$

but the present invention is not limited thereto.

According to some points of view, the aforementioned corresponding threshold OBSS_PD_THRESHOLD may represent: during performing spatial reuse, a maximum (or threshold) that is allowed for adjustment (more particularly, reduction) of the TX power of the TX packet TX_PKT, for example, a maximum of a power level decrement of the TX power of the TX packet TX_PKT, such as a threshold for determining whether a target power level decrement is allowed for decreasing the power level of the TX power of the TX packet TX_PKT. Regarding each candidate station of multiple candidate stations, the wireless communications device 100 (e.g. the MAC circuit 120, and more particularly, the threshold estimation circuit 124 therein) implemented based on one or more embodiments of the present invention may calculate a threshold dedicated to the aforementioned each candidate station, e.g., regarding the candidate station STA(i), calculate the threshold OBSS_PD_Th(x(i)) dedicated to the candidate station STA(i). In comparison with the related art, the present invention can control triggering of SR backoff more efficiently.

According to some embodiments, regarding any station STA(x) within the stations STA(1), STA(2), . . . and STA(X), the $x^{th}$ set of information STAinfo(x) within the multiple sets of information STAinfo (1), STAinfo (2), . . . and STAinfo (X) may comprise a TX power value TXPWR(x), a power tolerance range POWER_TOLERANCE(x), a power offset value PWR_Offset(x), an estimation distance EST DISTANCE(x), a MAC address MAC ADD(x), etc. of a TX packet TX_PKT(x), where the symbol "x" may represent an integer within an interval [1, X], but the present invention is not limited thereto. For brevity, similar descriptions for these embodiments are not repeated in detail here.

Figure 4:
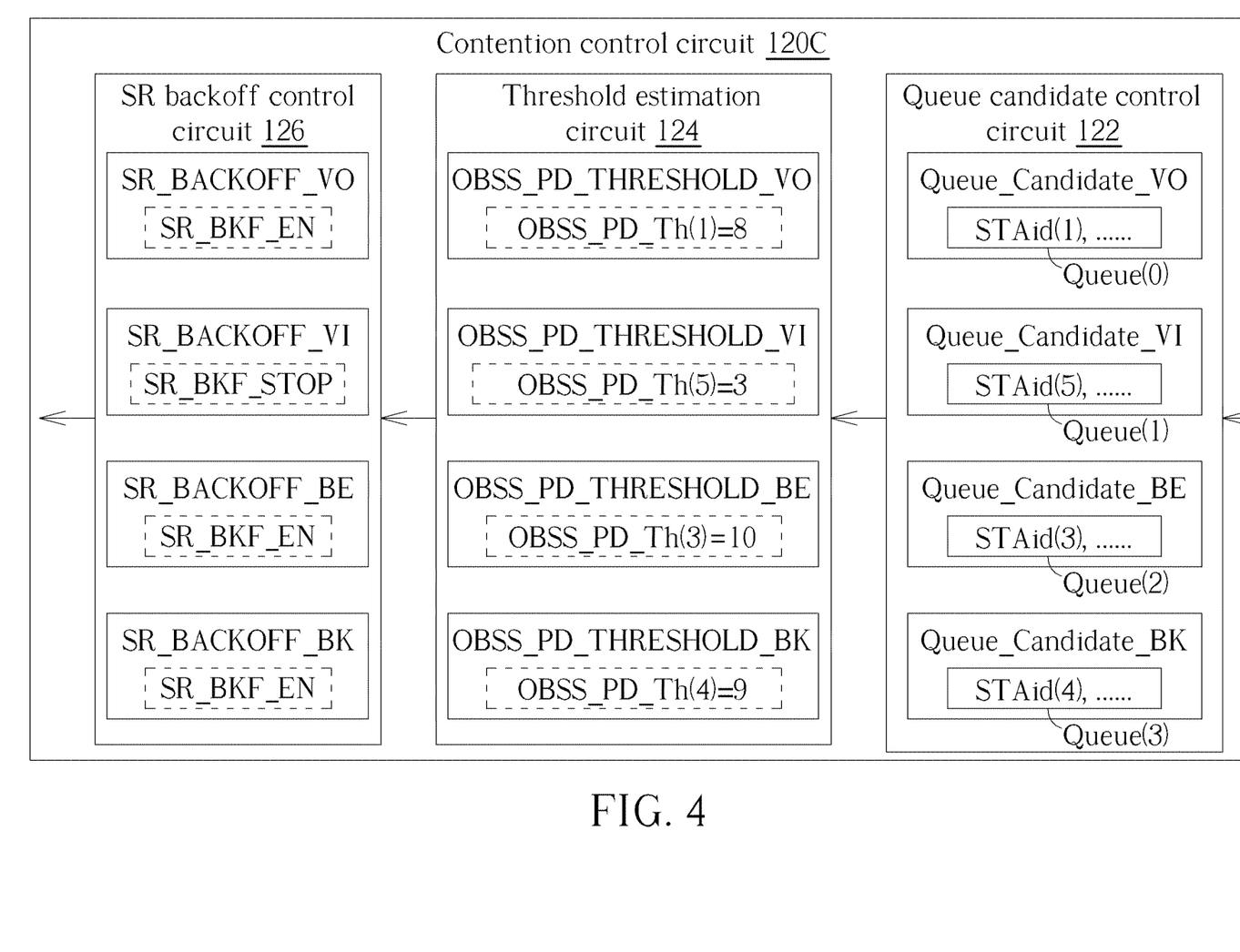
FIG. 4 is a control scheme of the method shown in FIG. 3 according to an embodiment of the present invention.

FIG. 4 is a control scheme of the method shown in FIG. 3 according to an embodiment of the present invention. The queue candidate control circuit 122 may comprise a set of sub-circuits Queue_Candidate_VO, Queue_Candidate_VI, Queue_Candidate_BE and Queue_Candidate_BK respectively corresponding to a set of packet types VO, VI, BE and BK, the threshold estimation circuit 124 may comprise a set of sub-circuits OBSS_PD_THRESHOLD VO, OBSS_PD_THRESHOLD VI, OBSS_PD_THRESHOLD BE and OBSS_PD_THRESHOLD BK respectively corresponding to the set of packet types VO, VI, BE and BK, and the SR backoff control circuit 126 may comprise a set of sub-circuits SR_BACKOFF_VO, SR_BACKOFF_VI, SR_BACKOFF_BE and SR_BACKOFF_BK respectively corresponding to the set of packet types VO, VI, BE and BK, where the set of packet types VO, VI, BE and BK may respectively correspond to different levels of priorities, and each set of sub-circuits within the three sets of sub-circuits may have a corresponding level of priority, but the present invention is not limited thereto. For example, the set of packet types VO, VI, BE and BK may respectively represent voice, video, best effect and background, and may respectively have a highest priority, a second highest priority, a third highest priority and a lowest priority.

According to this embodiment, the queue candidate control circuit 122 may comprise four queues Queue(0), Queue(1), Queue(2) and Queue(3) (e.g. i_max=3), for example, the queues Queue(0), Queue(1), Queue(2) and Queue(3) may queue indices {STAid(1), . . . }, {STAid(5), . . . }, {STAid (3), . . . } and {STAid(4), . . . }, respectively. After the execution of the loop comprising Steps S18-S24 is finished, the MAC circuit 120 (e.g. the queue candidate control circuit 122) may obtain the indices STAid(1), STAid(5), STAid(3) and STAid(4), and the MAC circuit 120 (e.g. the threshold estimation circuit 124) may obtain respective latest information based on these indices and accordingly calculate thresholds OBSS_PD_Th(1), OBSS_PD_Th(5), OBSS_PD_Th(3) and OBSS_PD_Th(4), where x(0)=1, x(1)=5, x(2)=3, and x(3)=4. For better comprehension, assume that OBSS_PD_Th (1)=8, OBSS_PD_Th(5)=3, OBSS_PD_Th(3)=10, OBSS_PD_Th(4)=9 and S_ind=5, where examples of values of these parameters may indicate respective power levels thereof, but the present invention is not limited thereto. After the execution of the loop comprising Steps S28-S34 is finished, the MAC circuit 120 (e.g. the threshold estimation circuit 124) has triggered SR backoff related to TX packets TX_PKT(1), TX_PKT(3) and TX_PKT(4), but has not triggered SR backoff related to a TX packet TX_PKT(5), making the set of sub-circuits SR_BACKOFF_VO, SR_BACKOFF_VI, SR_BACKOFF_BE and SR_BACKOFF_BK within the SR backoff control circuit 126 respectively have corresponding SR backoff enabled/disabled states. For example, the sub-circuits SR_BACKOFF_VO, SR_BACKOFF_BE and SR_BACKOFF_BK have an SR backoff enabled state SR_BKF_EN, and the sub-circuit SR_BACKOFF_VI has an SR backoff disabled state SR_BKF_STOP. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing spatial reuse (SR) enhancement in a multiple-station environment, applicable to a wireless communications device, the method comprising:
   in response to the wireless communications device receiving a receiving (RX) packet, checking an SR limitation to perform first stage SR determination;
   in response to the SR limitation conforming to a predetermined condition, triggering a transmitting (TX) module to start performing second stage SR determination, wherein the TX module is positioned in the wireless communications device;
   scanning at least one contention queue within the TX module to obtain an index of a candidate station from the at least one contention queue, wherein the candidate station is selected from a plurality of stations within the multiple-station environment;
   obtaining latest information of the candidate station from an internal database of the wireless communications device based on the index, to calculate a threshold dedicated to the candidate station according to the latest information of the candidate station; and
   comparing a strength indicator corresponding to the RX packet with the threshold to generate a comparison result, to control triggering of SR backoff according to the comparison result.

2. The method of claim 1, wherein the SR limitation conforming to the predetermined condition comprises the RX packet belonging to a predetermined type of packets; and the step of checking the SR limitation comprises:
   checking whether the RX packet belongs to the predetermined type of packets.

3. The method of claim 2, wherein the wireless communications device belongs to a Basic Service Set (BSS), and the predetermined type of packets represent one or more packets belonging to an Overlapping Basic Service Set (OBSS).

4. The method of claim 1, wherein the index is queued in the at least one contention queue to indicate that a TX packet corresponding to the candidate station is waiting for being transmitted to the candidate station.

5. The method of claim 1, wherein the internal database comprises at least one station information table, wherein the at least one station information table comprises multiple sets of information respectively corresponding to the plurality of stations, and a set of information corresponding to the candidate station in the multiple sets of information comprises the latest information of the candidate station; and obtaining the latest information of the candidate station from the internal database based on the index comprises:
   querying the at least one station information table within the wireless communications device according to the index, to obtain the latest information of the candidate station.

6. The method of claim 1, wherein the strength indicator represents a difference obtained by a RX packet power level of the RX packet minus a predetermined value.

7. The method of claim 1, wherein the comparison result indicates whether the strength indicator is less than the threshold; and controlling the triggering of the SR backoff according to the comparison result comprises:
   in response to the comparison result indicating that the strength indicator is less than the threshold, triggering the SR backoff.

8. The method of claim 1, wherein the index is queued in the at least one contention queue to indicate that a TX packet corresponding to the candidate station is waiting for being transmitted to the candidate station; regarding controlling the triggering of the SR backoff according to the comparison result, the SR backoff represents SR backoff related to the TX packet; and the method comprises:
   scanning the at least one contention queue to obtain another index of another candidate station from the at least one contention queue, wherein the other candidate station is selected from the plurality of stations, and the other index is queued in the at least one contention queue to indicate that another TX packet corresponding to the other candidate station is waiting for being transmitted to the other candidate station;
   obtaining latest information of the other candidate station from the internal database based on the other index, to calculate another threshold dedicated to the other candidate station according to the latest information of the other candidate station; and
   comparing the strength indicator corresponding to the RX packet with the other threshold to generate another comparison result, to control triggering of SR backoff related to the other TX packet according to the other comparison result.

9. An apparatus for performing spatial reuse (SR) enhancement in a multiple-station environment, applicable to a wireless communications device, the apparatus comprising:
   at least one memory, positioned in the wireless communications device, configured to store information for providing an internal database of the wireless communications device; and
   a Media Access Control (MAC) circuit, positioned in the wireless communications device and coupled to the at least one memory, configured to control operations of the wireless communications device, wherein:
      in response to the wireless communications device receiving a receiving (RX) packet, the MAC circuit checks an SR limitation to perform first stage SR determination;
      in response to the SR limitation conforming to a predetermined condition, the MAC circuit triggers a transmitting (TX) module to start performing second stage SR determination, wherein the TX module is positioned in the MAC circuit;
      the MAC circuit scans at least one contention queue within the TX module to obtain an index of a candidate station from the at least one contention queue, wherein the candidate station is selected from a plurality of stations within the multiple-station environment;
      the MAC circuit obtains latest information of the candidate station from the internal database based on the index, to calculate a threshold dedicated to the candidate station according to the latest information of the candidate station; and
      the MAC circuit compares a strength indicator corresponding to the RX packet with the threshold to generate a comparison result, to control triggering of SR backoff according to the comparison result.

10. The apparatus of claim 9, wherein the MAC circuit comprises:
an RX module, comprising:
an SR control circuit, coupled to an RX path within the wireless communications device, configured to execute the operations of checking the SR limitation to perform the first stage SR determination and triggering the TX module to start performing the second stage SR determination; and
the TX module, comprising:
a queue candidate control circuit, coupled to the SR control circuit, configured to execute the operation of scanning the at least one contention queue to obtain the index of the candidate station from the at least one contention queue, wherein the queue candidate control circuit comprises the at least one contention queue;
a threshold estimation circuit, coupled to the queue candidate control circuit, configured to execute the operation of obtaining the latest information of the candidate station from the internal database based on the index to calculate the threshold dedicated to the candidate station according to the latest information of the candidate station and the operation of comparing the strength indicator corresponding to the RX packet with the threshold to generate the comparison result to control the triggering of the SR backoff according to the comparison result; and
an SR backoff control circuit, coupled to the threshold estimation circuit and a TX path within the wireless communications device, configured to perform the SR backoff.

11. The apparatus of claim 10, further comprising:
a baseband module, coupled to the MAC circuit, configured to perform baseband processing; and
a radio frequency (RF) module, coupled to the baseband module, configured to perform RF processing, wherein the RX path and the TX path are formed by a set of components and another set of components within the RF module, respectively, and the wireless communications device receives the RX packet through the RX path.

12. The apparatus of claim 9, wherein the SR limitation conforming to the predetermined condition comprises the RX packet belonging to a predetermined type of packets; and the operation of checking the SR limitation comprises checking whether the RX packet belongs to the predetermined type of packets.

13. The apparatus of claim 12, wherein the wireless communications device belongs to a Basic Service Set (BSS), and the predetermined type of packets represent one or more packets belonging to an Overlapping Basic Service Set (OBSS).

14. The apparatus of claim 9, wherein the index is queued in the at least one contention queue to indicate that a TX packet corresponding to the candidate station is waiting for being transmitted to the candidate station.

15. The apparatus of claim 9, wherein the internal database comprises at least one station information table, wherein the at least one station information table comprises multiple sets of information respectively corresponding to the plurality of stations, and a set of information corresponding to the candidate station in the multiple sets of information comprises the latest information of the candidate station; and the MAC circuit queries the at least one station information table according to the index, to obtain the latest information of the candidate station.

16. The apparatus of claim 9, wherein the strength indicator represents a difference obtained by a RX packet power level of the RX packet minus a predetermined value.

17. The apparatus of claim 9, wherein the comparison result indicates whether the strength indicator is less than the threshold; and in response to the comparison result indicating that the strength indicator is less than the threshold, the MAC circuit triggers the SR backoff.

18. The apparatus of claim 9, wherein the index is queued in the at least one contention queue to indicate that a TX packet corresponding to the candidate station is waiting for being transmitted to the candidate station; regarding controlling the triggering of the SR backoff according to the comparison result, the SR backoff represents SR backoff related to the TX packet; the MAC circuit scans the at least one contention queue to obtain another index of another candidate station from the at least one contention queue, wherein the other candidate station is selected from the plurality of stations, and the other index is queued in the at least one contention queue to indicate that another TX packet corresponding to the other candidate station is waiting for being transmitted to the other candidate station; the MAC circuit obtains latest information of the other candidate station from the internal database based on the other index, to calculate another threshold dedicated to the other candidate station according to the latest information of the other candidate station; and the MAC circuit compares the strength indicator corresponding to the RX packet with the other threshold to generate another comparison result, to control triggering of SR backoff related to the other TX packet according to the other comparison result.

19. The apparatus of claim 9, wherein the apparatus comprises the wireless communications device.

* * * * *